United States Patent [19]
Honda et al.

[11] Patent Number: 5,653,385
[45] Date of Patent: Aug. 5, 1997

[54] AIR CONDITIONING SYSTEM FOR VEHICLE

[75] Inventors: Yuji Honda, Okazaki; Katsuhiko Samukawa, Oobu, both of Japan

[73] Assignee: Nippondenso Co., Ltd., Kariya, Japan

[21] Appl. No.: 525,168

[22] Filed: Sep. 8, 1995

[30] Foreign Application Priority Data

Sep. 9, 1994 [JP] Japan .................. 6-215728

[51] Int. Cl.$^6$ .................. F24F 7/00; G05D 23/00
[52] U.S. Cl. .................. 236/49.3; 62/186; 236/91 C; 165/204
[58] Field of Search .................. 62/186; 236/49.3, 236/91 C; 165/43, 204

[56] References Cited

U.S. PATENT DOCUMENTS

| | | | |
|---|---|---|---|
| 5,165,595 | 11/1992 | Horio et al. | 236/49 |
| 5,209,079 | 5/1993 | Kajino et al. | 236/91 C |
| 5,452,587 | 9/1995 | Honda et al. | 236/49.3 |

FOREIGN PATENT DOCUMENTS 5-131837  5/1993  Japan .

Primary Examiner—William E. Wayner
Attorney, Agent, or Firm—Cushman, Darby & Cushman IP Group of Pillsbury Madison & Sutro LLP

[57] ABSTRACT

An air conditioning apparatus for the cabin of a vehicle wherein an increased amount and/or temperature of an air flow from an upper outlet is obtained when sun radiation is introduced into the cabin. A provisional air flow correction amount DVA1 is calculated based on a detected sun radiation amount. A final air flow correction amount DVA is calculated as the provisional air flow correction amount DVA1 multiplied by a sun radiation correction factor GUN, the value of which is varied from 1.0 to 0 as the increase in a value of a required discharged air temperature TAOB in a range of the temperature TAOB higher than 50° C. The amount of sun radiation, which makes an upper level discharged air temperature to be equal to 20° C., is increased in accordance with the increase in the required discharged air temperature TAOB at the region of the temperature TAOB higher than 50° C. As a result, during the winter season, an increase in the air flow amount and the discharged air temperature for cancelling the sun radiation is suppressed, thereby preventing a driver and a passenger from feeling cold.

11 Claims, 8 Drawing Sheets

AIR CONDITIONING SYSTEM FOR VEHICLE

BACKGROUND OF THE INVENTION

1. Field of the Invention

The present invention relates to an air conditioning system for a vehicle. More particularly, the present invention relates to such a type of air conditioning system for a vehicle, wherein an air flow of low temperature is issued into a cabin of the vehicle from an upper opening of a duct of the system, in such a manner that a thermal load of solar radiation into the cabin is cancelled by the air conditioning system.

2. Description of Related Art

Japanese Unexamined Patent Publication No. 5-131837 discloses an air conditioning system for a vehicle, wherein application of solar radiation to a vehicle causes an increased amount of air flow to be calculated in such a manner that the increase in the thermal load due to the solar radiation is cancelled so as to obtain a corresponding increase in an amount of an air flow issued from an upper outlet of a duct to the cabin at a location corresponding to the face of a driver or a passenger. Furthermore, such an increase in the amount of the air flow issued from the upper opening is obtained as the air flow amount for cancelling the increased load by the solar radiation, multiplied by a weight factor, which has a value varied between 0 to 1.0 in accordance with a difference between a set temperature of the air in the cabin and an actual air temperature in the cabin. Such a multiplication of the varied weight factor can prevent the discharged air flow amount from being excessively increased in case of an existence of a large difference between the set temperature and the actual cabin temperature, which is, for example, obtained during a winter season where the cabin temperature is low, thereby preventing a driver or a passenger from feeling cold. Namely, in winter, a driver or a passenger is less sensitive to the heat of the sun, so that the discharge of a cold air flow from the upper outlet would cause the driver or the passenger to feel cold. In Japanese Unexamined Patent Publication No. 5-131837, an increase in the air flow amount from the upper outlet due to a sun radiation is suppressed when a difference in the cabin temperature between the set value and the actual value is large. However, in this prior art, a reduction in the difference causes the value of the weighting to approach 1.0, so that the value of the air flow increase based on the sun radiation is equal to the value which is obtained when the outside air temperature is high.

SUMMARY OF THE INVENTION

An object of the present invention to provide an air conditioning system capable of controlling an increase in a cooling effect by an air flow from an upper outlet for cancelling an increase in load induced by sun radiation, while preventing a passenger or driver from feeling cold during the winter season.

Another object of the present invention to provide an air conditioning system capable of increasing an air flow amount by an air flow from an upper outlet for cancelling an increase in load induced by sun radiation, while preventing a passenger or driver from feeling cold during the winter season.

Still another object of the present invention to provide an air conditioning system capable of decreasing a temperature of an air flow amount by an air flow from an upper outlet for cancelling an increase in load induced by sun radiation, while preventing a passenger or driver from feeling cold during the winter season.

According to the present invention, an air conditioning system for a cabin of a vehicle is provided, comprising:

a duct having, at its upstream end, an inlet for the introduction of an air flow and having, at its downstream end, an upper outlet opened to the cabin at its upper location and a lower outlet opened to the cabin at its lower location;

means for generating an air flow in the duct so that desired amount of the air is discharged from the desired at least one of the upper and lower outlets;

means for detecting the sun radiation amount introduced into the cabin;

means, based on the detected sun radiation amount, for calculating a degree of increase in a cooling effect by air discharged from said upper outlet into the cabin;

means for detecting a parameter related to a temperature of the air outside the cabin;

means, responsive to the detected parameter, for correcting the increased degree of the cooling effect when it is determined that the outside air temperature is smaller than a predetermined value, and;

means for controlling the air flow generating means in such a manner that a corrected cooling effect, by the air flow from the upper outlet, is obtained.

In the present invention, an outside air temperature lower than a predetermined value causes the cooling effect, by the air flow from the upper outlet, to be reduced, while cancelling the sun radiation. Thus, a driver or passenger is prevented from feeling cold.

According to the present invention, an air conditioning system for a cabin of a vehicle is provided, comprising:

a duct having, at its upstream end, an inlet for introduction of an air flow and having, at its downstream end, an upper outlet opened to the cabin at its upper location and a lower outlet opened to the cabin at its lower location;

means for generating an air flow in the duct so that a desired amount of the air is discharged from a desired at least one of the upper and lower outlets;

means for detecting the sun radiation amount introduced into the cabin;

means, based on the detected sun radiation amount, for calculating an increased amount of air discharged from said upper outlet into the cabin;

means for detecting a parameter related to a temperature of an-air outside the cabin;

means, responsive to the detected parameter, for correcting the calculated increased air amount so as cause it to be reduced when it is determined that the outside air temperature is smaller than a predetermined value; and means for controlling the air flow generating means in such a manner that a corrected increased air flow from the upper outlet is obtained.

In the present invention, an outside air temperature lower than a predetermined value causes the increase in an air flow amount from the upper outlet to be suppressed, while cancelling the sun radiation. Thus, a driver or passenger is prevented from feeling cold.

According to the present invention, an air conditioning system for a cabin of a vehicle is provided, comprising:

a duct having, at its upstream end, an inlet for introduction of an air flow and having, at its downstream end, an upper outlet opened to the cabin at its upper location and a lower outlet opened to the cabin at its lower location;

first means for obtaining an air flow of a desired temperature discharged from the upper and lower outlets;

second means for obtaining an air flow of a temperature of the air discharged from the upper outlet, which is independent form the temperature of the air flow obtained by the first means;

means for detecting the sun radiation amount introduced into the cabin;

means, based on the detected sun radiation amount, for calculating the temperature of the air to be discharged from the upper outlet;

means for detecting a parameter related to the temperature of the air outside the cabin;

means, responsive to the detected parameter, for correcting said calculated temperature so as cause it to be increased when it is determined that the outside air temperature is lower than a predetermined value; and means for controlling said second means in such a manner that the temperature of the air flow from the upper outlet to the corrected temperature.

In the present invention, an outside air temperature lower than a predetermined value causes a reduction in the temperature of an air flow from the upper outlet to be suppressed, while cancelling the sun radiation. Thus, a driver or passenger is prevented from feeling cold.

BRIEF EXPLANATION OF ATTACHED DRAWINGS

DESCRIPTION OF PREFERRED EMBODIMENTS

Figure 1:
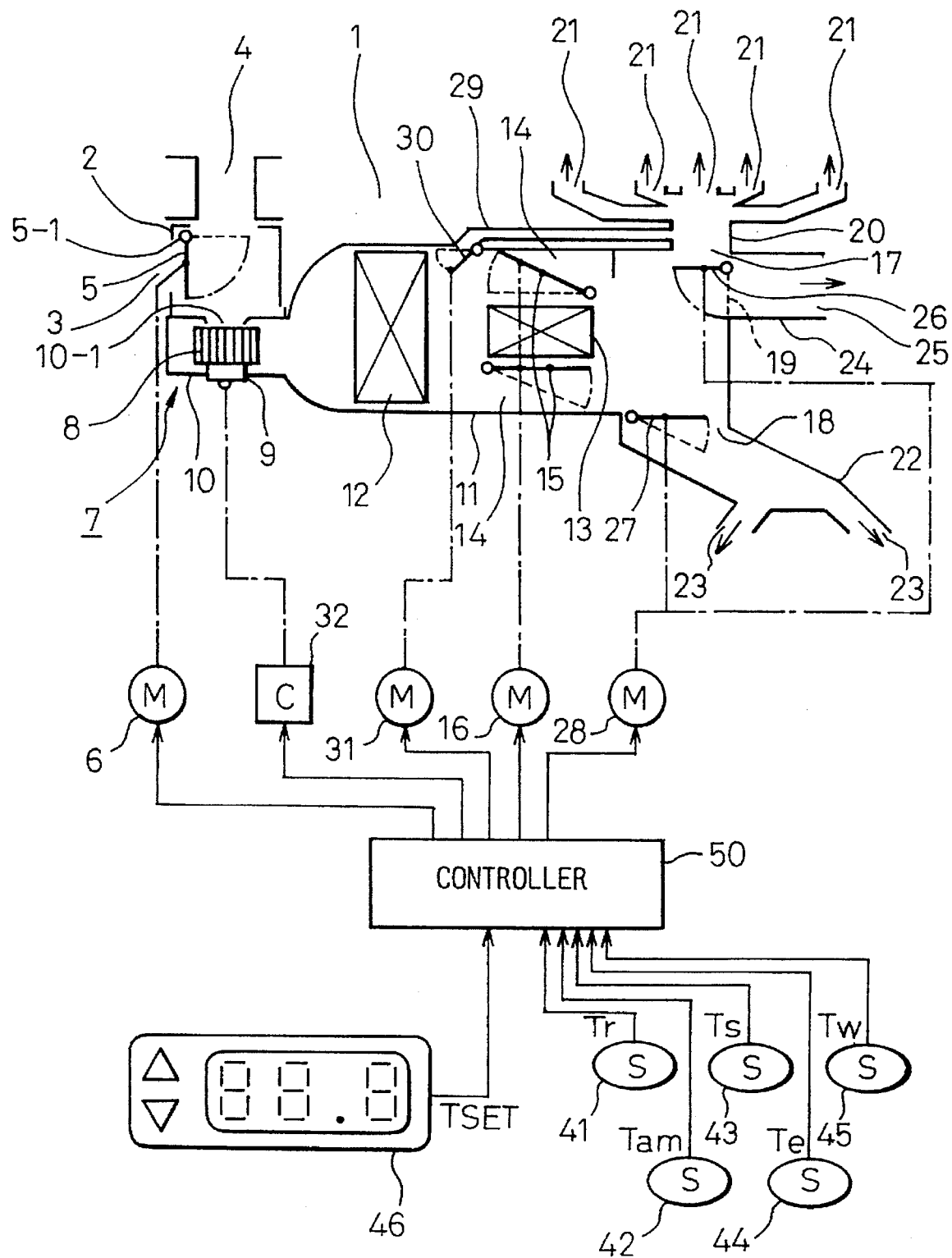
FIG. 1 is a general view illustrating an air conditioning system according to the present invention.

Now, an embodiment of the present invention will be explained with reference to attached drawings. In FIG. 1, a reference numeral 1 denotes schematically and generally illustrating an air conditioning apparatus for an automobile. In a well known manner, the air conditioning apparatus 1 is mainly arranged below an instrumental panel at a front portion in a cabin of the automobile. The air conditioning apparatus 1 includes a duct 11 having an upstream end for introduction of an air flow and a down stream end opened to a cabin. At the upstream end, the duct 11 is provided with a switching device including a casing 2 defining an inside air inlet 3 and an outside air inlet 4, and a switching member 5 moved about its axis of the rotation between a first position shown by a solid line where the inside air inlet 3 is closed, while the outside air inlet 4 is opened and a second position shown by a dotted line where the inside air inlet 3 is opened, while the outside air inlet 4 is closed. The axis of the rotation of the switching member 5 is connected to a servo-motor 6 which generates a rotating movement, which causes the switching member 5 to be moved between the first and the second positions.

Arranged on one side of the casing 2 remote from the inlets 3 and 4 is a centrifugal blower 7, which is constructed by a scroll casing 10 fixedly connected to the casing 2 of the switching device, a centrifugal fan 8 located in the casing 10, and a electric motor 9 which generates a rotating movement which is applied to the fan 8. The rotating movement of the centrifugal fan 8 causes the air to be sucked through an axial opening 10-1 and causes the sucked air to be discharged radially outwardly to the scroll casing 10. Connected to the electric motor 9 is a blower controller 32 for controlling an electric voltage applied to the motor 9 so as to control the rotating speed of the centrifugal fan 8.

The air conditioning duct 11 is, at its upstream end, connected to an outlet end of the scroll casing 10. Adjacent the upstream end, an evaporator 12 for cooling the air flow in the duct 11 is arranged. The evaporator 12 is, in a well known manner, connected to a compressor, a condenser, a receiver and a pressure reducer (expansion valve), which are not shown in the drawing, so that a closed circuit for a refrigerant is created. The compressor has a rotating shaft (not shown) which is, in a well known manner, connected to a crankshaft of an internal combustion engine Via an electromagnetic clutch. Engagement of the clutch causes the rotating movement of the crankshaft to be transmitted to the compressor for executing a refrigerating cycle in the closed circuit. Contrary to this, a disengagement of the clutch causes the compressor to be disconnected from the crankshaft so as to stop the execution of the refrigerating cycle.

Downstream from the evaporator 12, a heater core 13 is located in such a manner that by-pass passageways 14 are formed. The heater core 13 has a heat exchanging tube (not shown) in which a hot water from a cooling system (not shown) of an internal combustion engine is passed. Furthermore, the air flow in the duct 11 is contacted with the heat exchanging pipe. As a result, a heat exchange occurs between the air flow and the hot water, which causes the air flow to be heated. Air mix doors 15 arranged in the respective by-pass passageways 14. Each of the air mix doors 15 is moved between a position shown by a solid line and a position shown by a dotted line. Furthermore, each of the air mix doors 15 can take a desired intermediate position between the solid and dotted positions, so that a ratio of the amount of the air passed through the by-pass passageway 14 and the amount of air passed through the heater core 13 is controlled. Furthermore, at a location in the duct 11 downstream from the heater core, the cool air flow passed through the by-pass passageways 14 is combined with the hot air passed through the heater core 13. As a result, the temperature of the mixed air flow is controlled continuously in accordance with the degree of the opening of the air mix doors 15. The air mix doors 15 are connected to servo-motor 16 as a driving means for obtaining a continuously changed degree of the opening of the air mix doors 15.

At the downstream end, the duct 11 is formed with connection ducts 17, 18 and 19 for directing air flows to different locations of the cabin. Namely, the duct 17 is connected, via an upper duct 20, to upper outlets (face outlets) 21 opened to upper positions of the cabin corresponding to an upper part of a driver or passenger in the cabin, so that an air flow from the upper outlets 21 is directed to the upper part of the driver or passenger. The duct 18 is connected, via a lower duct 22, to lower outlets (foot outlets) 23 opened to lower positions of the cabin corresponding to a lower part of a driver or passenger in the cabin, so that an air flow from the lower outlets 23 is directed to the lower part of the driver or passenger. The duct 19 is connected, via a defroster duct 24, to a defroster outlet 25, which is opened at a top side of a dash board (not shown) in the cabin, so that an air flow from the defroster outlet 25 is directed to the bottom of a windshield (not shown).

A switching door 25 is located at a location where the ducts 17 and 19 are connected to the duct 11, so that the switching door 25 is moved between a position as shown by a solid line where the air from the main duct 11 is directed to the defroster duct 24 and a second position as shown by a dotted line where the air from the main duct 11 is directed to the upper duct 17. A switching door 27 is moved a position as shown by a solid line where the duct 18 is closed and a position as shown by a dotted line where the duct 18 is opened. A servo-motor 28 is connected to the switching doors 26 and 27, and is controlled so that a desired mode is selected from an upper level mode, a lower level, a by-level mode and a defroster mode. At the upper level mode, the air flow is discharged from the upper outlets 21. At the lower level mode, the flow is discharged from the lower outlets 23. At by-level mode, the air flow is discharged not only from the upper outlets 21 but also from the lower outlet 23. At the defroster mode, the air flow is discharged from the defroster outlets 25.

A cooling air by-pass conduit 29 is connected to the duct 11 so as to by-pass the heater core 13 and the air mix doors 15. Namely, the by-pass conduit 29 has an upstream end connected to the duct 11 at a location between the evaporator 11 and the heater core 13 and a downstream end connected to the upper duct 20. At a location adjacent the inlet end of the by-pass conduit duct 29, a cool air by-pass door 30 is arranged. The cool air by-pass door 30 is connected to a servo-motor 31, so that the by-pass door is moved between an opened position as shown by a solid line where the cool air from the evaporator 12 is introduced into the conduit 29 and a closed position as shown by a dotted line where the introduction of the cool air into the by-pass conduit 29 is stopped.

A reference numeral 50 denotes a controller as a microcomputer unit, which functions to control the operation of the air conditioning system. Various sensors are connected to the controller 50 for introducing various operating conditions. Namely, an inside air temperature sensor 41 detects a temperature Tr in the cabin, and issues a signal representing the temperature in the cabin. An outside air temperature sensor 42 detects a temperature Tam of an atmospheric air, and issues a signal representing the temperature of the atmospheric air. A sun radiation sensor 43 detects an amount of the sun radiation amount Ts introduced into the cabin, and issues a signal representing the amount of the sun radiation. An after-evaporator sensor 44 is arranged in the duct at a location just after the evaporator 12, so that temperature Te of the air inside the duct 11 just after passage through the evaporator 12 is detected, so that a signal representing the temperature of the air, after it has contacted the evaporator 12, is issued. A cooling water temperature sensor 45 is arranged adjacent the heater core, so that a temperature Tw of the engine cooling water is indirectly detected, so that a signal representing the temperature of the engine cooling water is issued. Finally, a reference numeral 46 denotes a controller for generating a manually variable set signal for a desired temperature $T_{SET}$ in the cabin.

The controller 50 includes a microcomputer, which is, in a conventional manner, constructed by various components (not shown) such as a central processing unit (CPU), a read only memory (ROM), a random access memory (RAM) and Input/Output devices. The controller 50 further includes an analogue to digital converter for converting analogue signals from the sensors 41 to 51 to digital signals, which are supplied to the microcomputer. Finally the controller 50 is supplied of an electric power from a battery (not shown) of the vehicle when an ignition switch is made ON for starting the operation of the internal combustion engine.

The microcomputer is provided with programs stored in the ROM, which allows the air conditioning system to be desirably operated. Now, the operation of the air conditioning system of the present invention will be explained with reference to a flowchart in FIG. 2. The program enters into a routine at step 100. Then, at step 110, various data is read out. Namely, the temperature Tr, Tam, Ts, Te and Tw of the inside air temperature sensor 41, the outside air temperature, he sun radiation sensor 43, the after-evaporator sensor 44 and the engine cooling water temperature sensor 45, after being subjected to analogue to digital conversion by the A-D converter, are read out at the step 110. Furthermore, the set temperature Tset set by the temperature setter 46 is read out. These read-out values are stored in the RAM.

At step 120, based on the above data stored in the RAM, a required discharged air temperature TAOB is calculated by the following equation stored in the RAM, $$TAOB = Kset \times Tset - Kr \times Tr - Kam \times Tam - Ks \times Ts + C \quad (1)$$

where Kset, Kr, K and Ks are gains, and C is a compensation constant.

Figure 3:
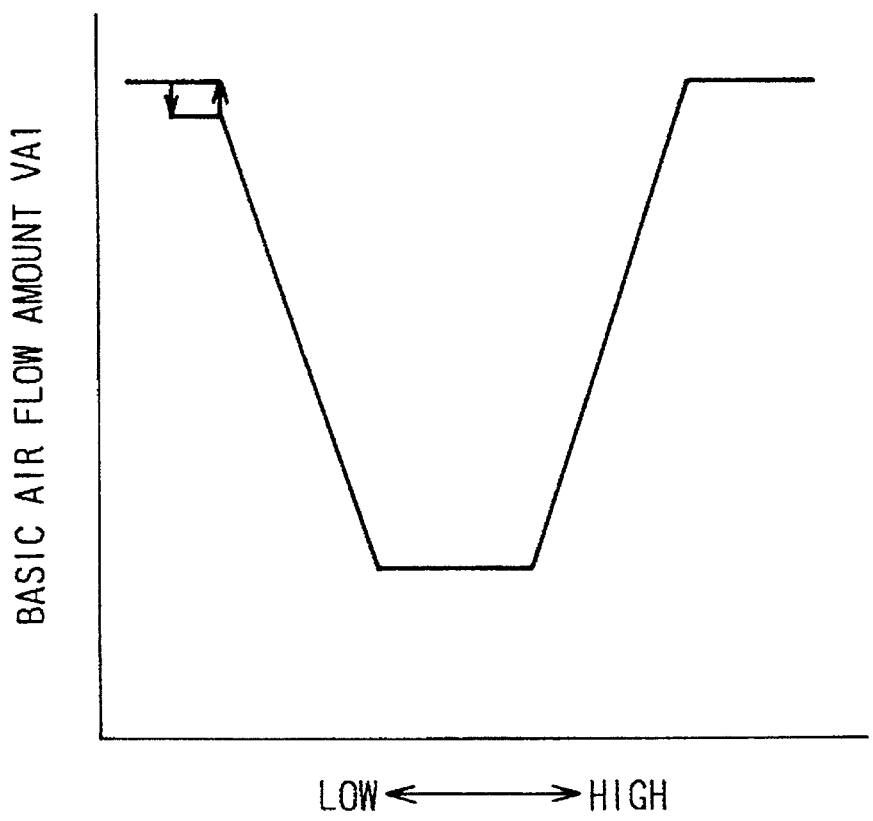
FIG. 3 is a graph showing a relationship between a required discharged air temperature (TAOB) and a basic air flow amount (VA1).

At the following step 130, a basic air flow amount VA1, which corresponds to a degree of a voltage of an electric signal applied to the blower motor 9, is calculated based on a predetermined relationship between the values of TAOB and the value of VA1 as shown in FIG. 3. Namely, the relationship as a two dimensional map between the values of TAOB and the value of VA1 is stored in the ROM in the controller 50, and a well-known map interpolation is executed so that a value of the basic air flow amount VA1 is calculated, corresponding to a value of the required discharged air temperature TAOB calculated by the equation (1). The relationship between the TAOB and the basic air flow amount VA1 is such that a lower or higher value of the required discharged air temperature requires a larger value of the basic air flow amount VA1, while a medium value of the required discharged air temperature requires a medium value of the basic air flow amount VA1.

Figure 2:
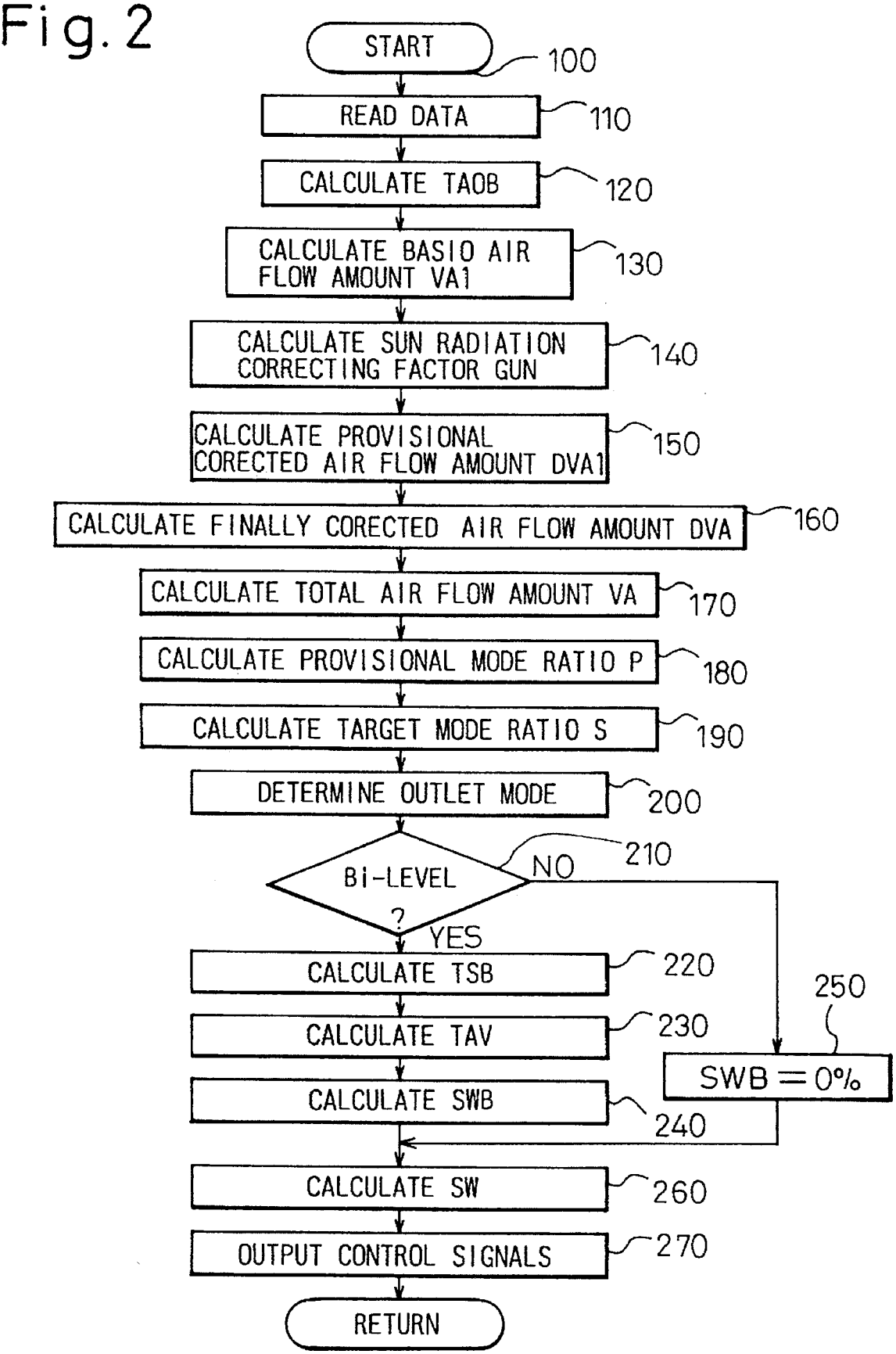
FIG. 2 is a flow chart illustrating the operation of the present invention.
Figure 4:
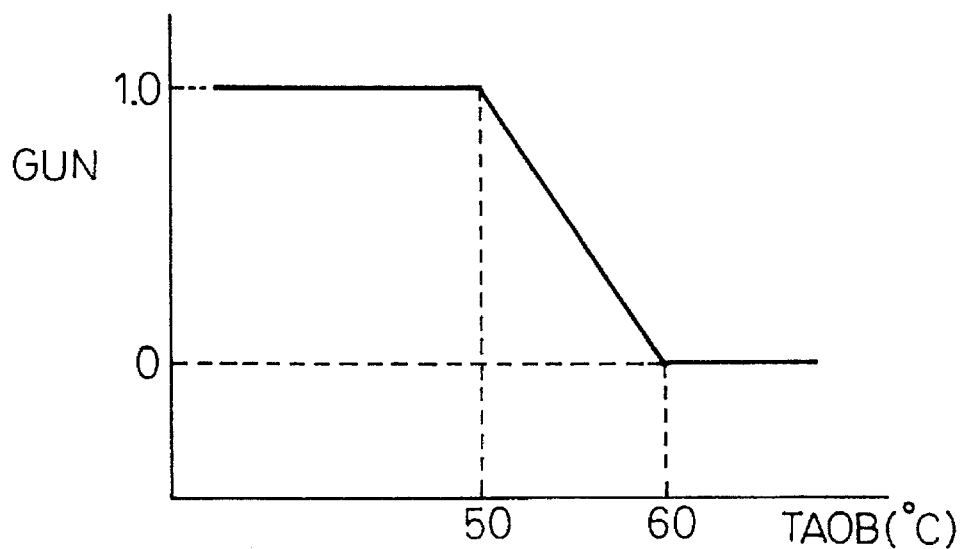
FIG. 4 is a graph showing a relationship between the required discharged air temperature (TAOB) and a sun radiation correction factor (GUN).

At the following step 140 of FIG. 2, a sun radiation correction factor GUN is calculated based on a desired relationship between the required discharged air temperature TAOB and the sun radiation correction factor GUN as shown in FIG. 4, which relationship is stored in the ROM as a map. Namely, a map is constructed of the values of TAOB and the values of GUN, and a map interpolation calculation is done so that a value of the sun radiation correction factor GUN, which corresponds to the value of the required discharged air temperature TAOB, is calculated by the equation (1). As shown in FIG. 4, the value of the sun radiation correction factor GUN is equal to 1.0 when the required discharged air temperature TAOB is smaller than 50° C., is reduced in accordance with the increase in the value of the TAOB when the value of the TAOB is between 50° to 60° C., and is maintained at 0 when the required discharged air temperature TAOB is higher than 60° C.

Figure 5:
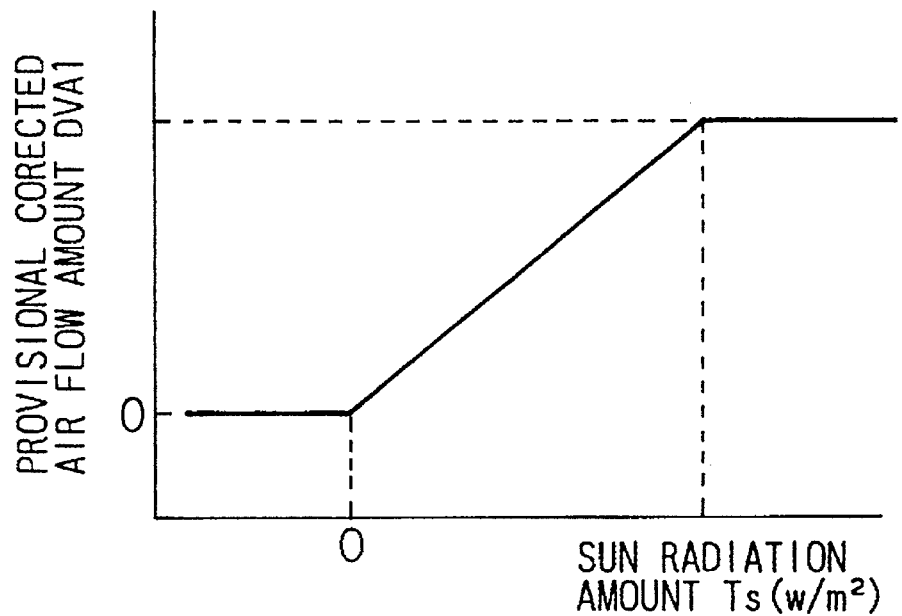
FIG. 5 is a graph showing a relationship between a sun radiation amount (Ts) and a provisional correction air amount DVA1.

At the following step 150, an upper level outlet increased air amount (a provisional air correction amount) DVA1, which is an increased air amount from the top outlet 21 for not making a driver or passenger feel hot irrespective of thermal load induced by a sun radiation amount Ts. Namely, the ROM stores a map between values of the sun radiation amount Ts and the values of the provisional air correction amount DVA1 as shown in FIG. 5. A map interpolation calculation is executed in order to obtain a value of the provisional air correction amount DVA1 corresponding to a detected value of the sun radiation amount Ts sensed by the sun radiation sensor 43. As shown in FIG. 5, in the relationship between the Ts and the DVA1, the value of DVA1 is zero when the value of the sun radiation Ts is zero. As the sun radiation value Ts increases, provisional air correction amount DVA1 is increased along a linear relationship. When the value of the sun radiation Ts is increased to a predetermined value, the value of the provisional correction amount of the air flow DVA1 is maintained be constant.

At the following step 160, by using the sun radiation correction factor GUN obtained at the step 140 and the increased upper outlet air flow amount DVA1 obtained at the step 150, a final corrected air flow amount DVA is calculated based on the following equation (2) stored in the ROM.

$$DVA = GUN \times DVA1 \qquad (2)$$

At the following step 170, by using the basic air flow amount VA1 and the final corrected air flow amount DVA, a total air flow amount VA discharged into the cabin is calculated based on the following equation (3) stored in the ROM.

$$VA = VA1 + DVA \qquad (3)$$

Figure 6:
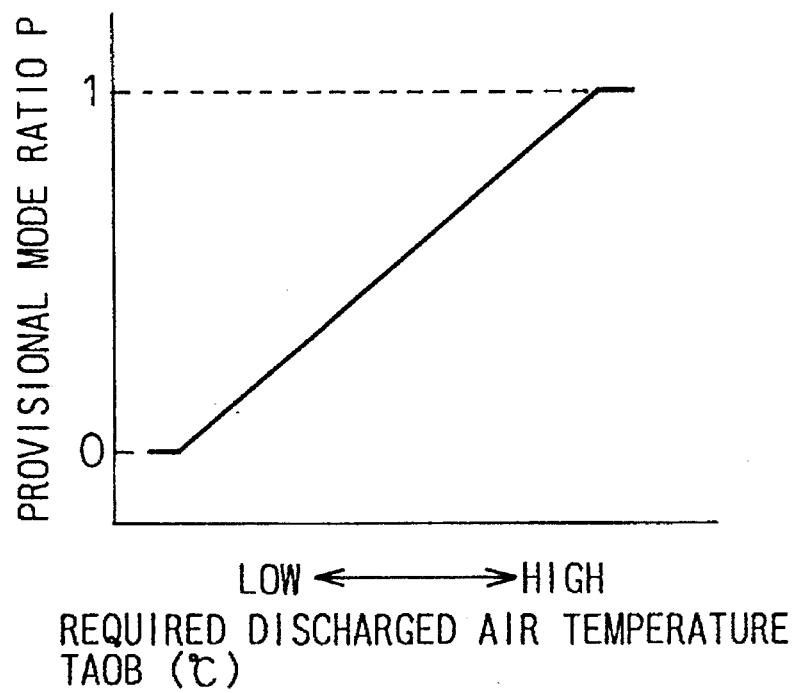
FIG. 6 is a graph showing a relationship between the required discharged air temperature (TAOB) and a provisional mode ratio.

At the following step 180, a provisional mode ratio P corresponding to the required discharged air temperature TAOB is calculated by using a relationship between TAOB and P as shown in FIG. 6 stored in the ROM, which is the ratio of the amount of the air discharged from the lower outlets 21 to the total amount of the air discharged into the cabin. Namely, the ROM is provided with a map between values of the TAOB and values of P, and a map interpolation is executed to obtain a value of the provisional mode ratio P corresponding to the value of the required discharged air temperature TAOB calculated at the step 120. As shown in FIG. 6, the relation between the required discharged air temperature TAOB and the provisional mode ratio P is such that the higher the value of the TAOB becomes, higher is the value of the P. The value the mode ratio P of 1.0 means that all of the air is discharged from the lower outlets 23 (lower outlet mode), while the value the mode ratio P of 0 means that all of the air is discharged from the upper outlets 21 (upper outlet mode).

At the following step 190, by using the basic air flow amount VA1 calculated at the step 130, the final correction amount DVA at the step 160 and the provisional mode ratio at the step 180, a target mode ratio S is calculated based on the following equation (4).

$$S = P \times \frac{VA1}{VA1 + DVA} \qquad (4)$$

Figure 7:
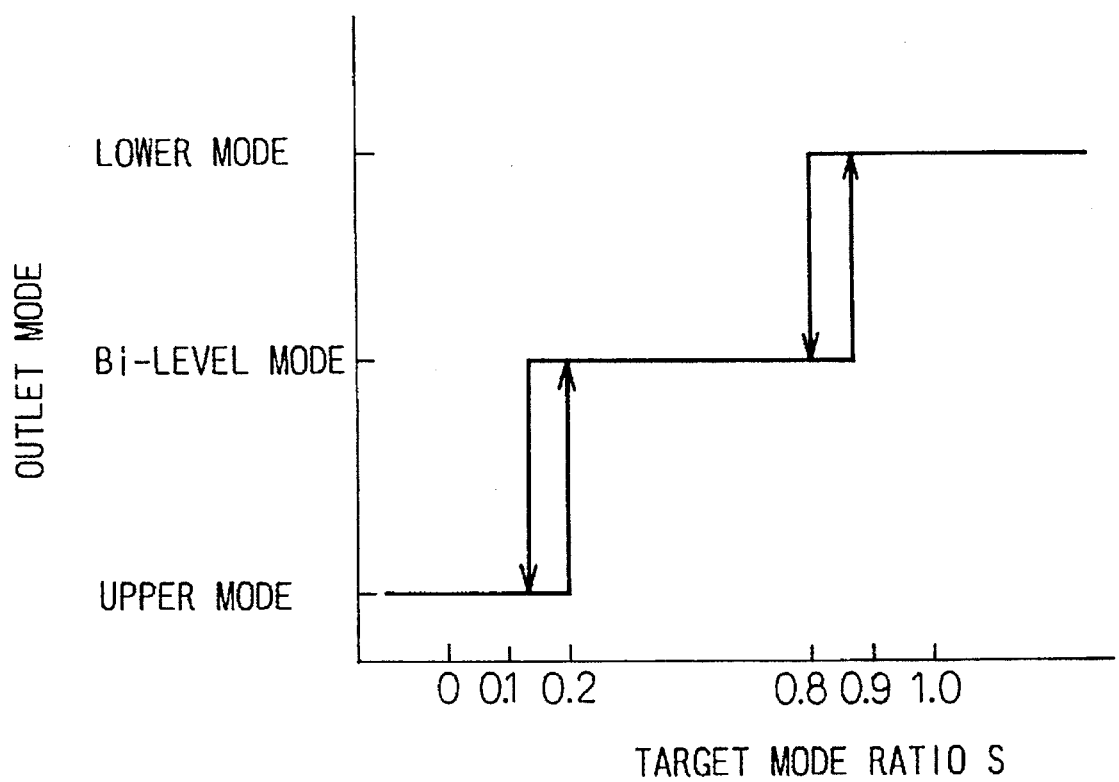
FIG. 7 is a graph showing a relationship between a target mode ratio and outlet modes.

At the following step 200, a determination of the outlet mode matched to the target mode ratio calculated at the step 190 is done by using a relationship between the target mode ratio S and the outlet modes as shown in FIG. 7. Namely, a map between the values of the target mode ratio S and outlet modes (upper mode, by-level mode, and lower mode) are stored in the ROM, and a determination of one of modes matched to the calculated target mode ratio at the step 190 is done. As shown in FIG. 7, the upper mode is selected by a larger value of the target mode ratio S, the lower mode is selected by a smaller value of the target mode ratio S, and bi-level mode is selected by a medium value of the target mode ratio S. In more detail, the characteristic with a hysteresis is such that an increase of the target mode ratio to a value of 0.2 causes the mode to be switched from the upper mode to the bi-level mode, and an increase of the target mode ratio S to a value of 0.9 causes the mode to be switched from the bi-level mode to the lower mode. Contrary to this, a reduction of the target mode ratio S to a value of 0.8 cause the mode to be switched from the lower outlet mode to the bi-level mode, and a reduction of the target mode ratio S to a value of 0.1 causes the mode to be switched from the upper outlet mode.

Figure 8:
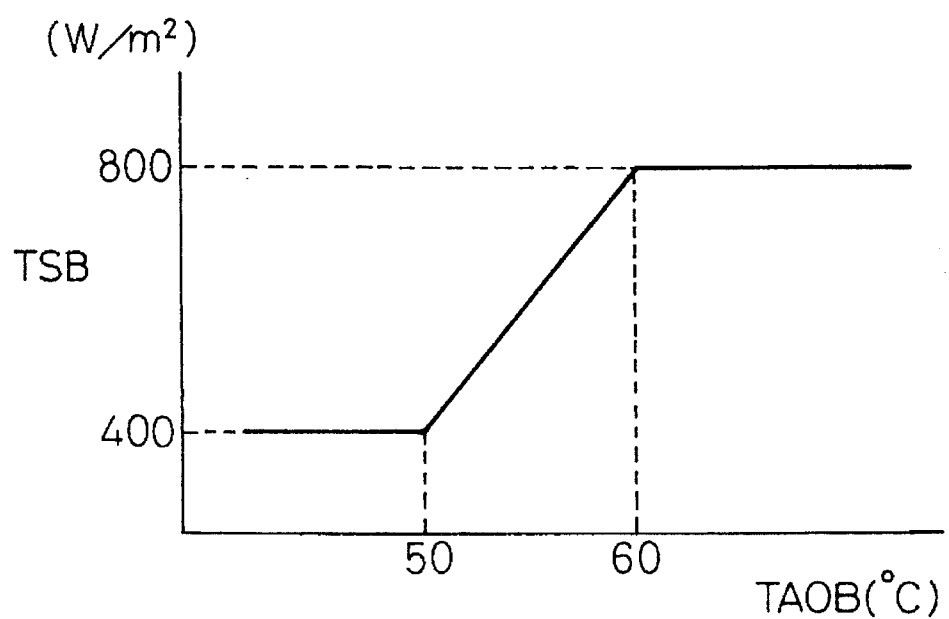
FIG. 8 is a graph showing a relationship between the required discharged air temperature (TAOB) and a target air temperature correcting sun radiation amount (TSB).

At step 210, it is determined that the mode determined at the step is the bi-level mode. The result of the determination of Yes at the step 210 causes the routing to flow into a step 220, where a sun radiation amount corresponding to the target temperature TAV of 20° C. of the air discharged from the upper outlets 21 (sun radiation amount TSB for correction of the target temperature) is calculated based on a relationship as shown in FIG. 8. Namely, the ROM includes a map between values of the required discharged air temperature TAOB and values of sun radiation amount TSB, and a map interpolation calculation is executed for obtaining a value of the radiation amount TSB for correction corresponding to the value of the temperature TAOB obtained at the step 120. As shown in the setting of the correction radiation amount TWB in FIG. 8, the value of the TSB is 400 W/m², when the required air temperature TAOB is below 50° C. Then, the value of TSB increases as the value of the TAOB increase. When the value of the required discharged air temperature TAOB is increased to 60° C., the correction sun radiation amount TSB of a value of 400 W/m² is maintained.

Figure 9:
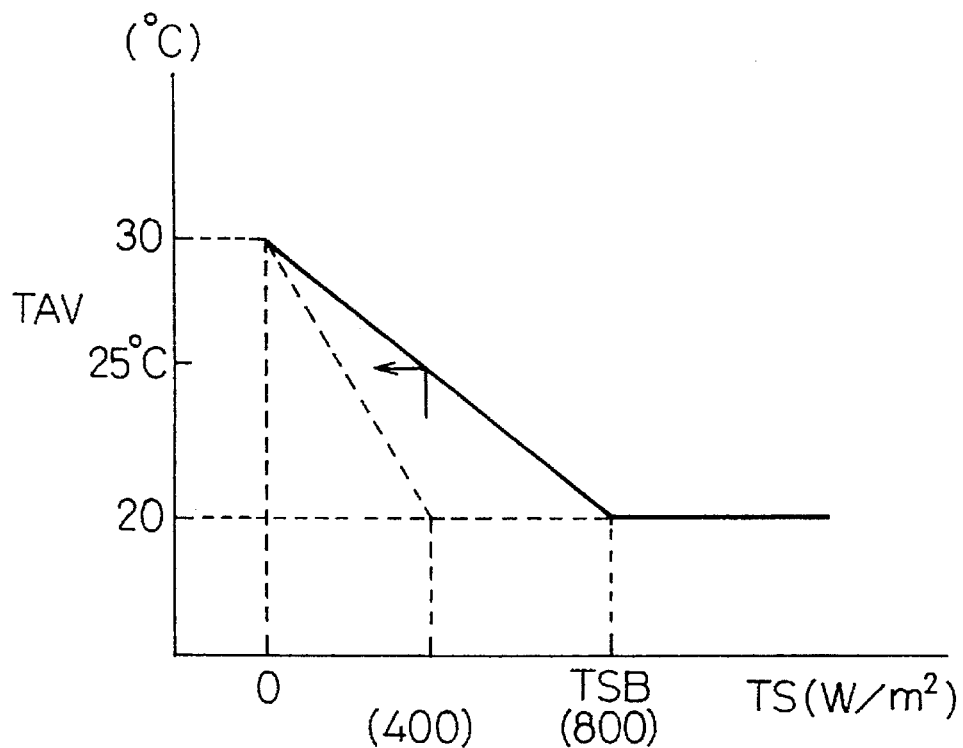
FIG. 9 is a graph showing relationship between the target air temperature correcting sun radiation amount (TSB) and a target discharged air temperature (TAV).

At the following step 230, a target discharged air temperature TAV is calculated based on a relationship between the sun radiation amount Ts and the target discharged air temperature TAV as shown in FIG. 9. The ROM includes a map between the correction sun radiation amount TSB and the target discharged air temperature TAV is expressed by TAV=−a×Ts+c in a range of the sun radiation amount Ts of values between 0 and TSB, where a and b are constants. Namely, the value of the target discharged air temperature TAV is 30° C. when the sun radiation amount Ts is zero and is 20° C. when the sun radiation amounts is equal to the correction sun radiation amount calculated at the step 220 along the curve in FIG. 8. Since the value of the TSB is varied in accordance with the value of the required discharged air temperature TAOB as shown in FIG. 8, the value of the a and b are varied in accordance with the value of the TAOB. In more detail, when the value of the TAOB is the first predetermined temperature (50° C.), the value of the correction sun radiation amount TSB is 400 W/m² as shown in FIG. 8, which causes the target discharged air temperature TAV to attain a value of 20° C. as will be seen from FIG. 9. Contrary to this, when the value of the TAOB is the second predetermined temperature (60° C.), the value of the correction sun radiation amount TSB is 800 W/m² as shown in FIG. 8, which causes the target discharged air temperature TAV to attain a value of 20° C. as will be seen from FIG. 9. In other words, larger values of the constant and are obtained when the TAOB is 50° C. in comparison with those when the TAOB is 60° C.

At step 240, by using the target discharge air temperature TAV calculated at the step 230, the after-evaporator temperature Te sensed by the sensor and the required discharged air temperature TAOB calculated at the step 120, a degree SWB of an opening of the cool air by-pass conduit 29 is calculated based the following equation (5).

$$SWB = \frac{TAV - Te}{TAOB - Te} \times 100(\%) \quad (5)$$

When a result of the determination at the step 210 is NO, i.e., the mode selected at the step 200 is the upper level outlet mode or lower level outlet mode, the routine flows into a step 250, where the degree SWB of an opening of the cool air by-pass conduit 29 is set to zero, i.e., the by-pass valve 30 fully closes the conduit 29.

The determination of the degree SWB of an opening of the cool air by-pass conduit 29 causes the routine to flow into a step 260, where the degree of the opening of the air mix doors 15 are calculated based on the following equation (6).

$$SWB = \frac{TAOB - Te}{TW - Te} \times 100(\%) \quad (6)$$

Then, the routine flows to a step 270, where the controller 50 issues signals directed to the blower controller 32, and servo-motors 28, 31 and 16 so as to obtain the blower voltage of VA calculated at the step 170, the mode determined at the step 200, the degree of the opening SWB of the cool air by-pass door 30 calculated at the step 240 (or step 250) and the degree of the opening SW of the air mix door 15 calculated at the step 260.

In the first embodiment described above, the final corrected air flow amount DVA for correcting the basic air amount VA1 to obtain the required air temperature TAOB is calculated as a product of the provisional corrected air flow amount DVA1 varied in accordance with the sun radiation amount Ts (FIG. 5) and the sun radiation correction factor GUN varied in accordance with the required air temperature TAOB (FIG. 4). The value of the sun radiation correction factor GUN is reduced in accordance with the increase in the required air temperature TAOB at the region of the latter larger than 50° C. (first predetermined temperature). In other words, in this temperature region, the larger the value of the required air temperature TAOB, the smaller is the amount of the air flow from the upper outlets 21. Furthermore, at the region of the required temperature TAOB larger than 60° C. (second predetermined temperature), the value of the sun radiation correction factor GUN is zero, which causes the amount of the air flow from the upper outlets 21 to become to be zero.

An advantage of the first embodiment will now be explained. Namely, during winter season, the outside air temperature or the inside air temperature is low, which may cause the required air temperature TAOB to be higher than the first temperature (50° C.), which cause the value of the sun radiation correction factor GUN to be reduced as shown in FIG. 4, thereby reducing the corrected air flow amount DV, which is calculated by the equation (2), causing the value of the mode ratio S calculated by the equation (4) to be correspondingly increased. As a result of the increase in the value of the mode ratio S, irrespective of an existence of the sun radiation, the amount of the air discharged from the upper outlets 21, for canceling the sun radiation, is reduced. As a result, the sun radiation load canceling operation is executed without making a driver or a passenger feel cold. Furthermore, when it is much colder, i.e., the required air temperature TAOB is higher than the second predetermined value (60° C.), the correction factor GUN for the sun radiation become zero as shown in FIG. 4, which causes the value of the mode ratio to be equal to 1.0, which prevents an air flow from the upper outlets 21 irrespective of the existence of the sun radiation. As a result, an air conditioning control, which is first of all directed to preventing a driver or passenger from feeling cold, is realized.

Furthermore, in the above embodiment, the target discharged air temperature TAV is calculated in accordance with the characteristic in FIG. 9, where the TAV is reduced in accordance with the increase in the correction sun radiation amount TSB calculated based on the required discharged air temperature TAOB as shown in FIG. 8. Thus, target discharged air temperature TAV is varied in accordance with the required discharged air temperature TAOB at the instant. Namely, assume that the detected sun radiation amount Ts is 400 W/m². In this case, if the required discharge air temperature calculated by the equation (1) is 50° C., the target temperature correction sun radiation amount TSB has a value of 400 W/m² as shown in FIG. 8, so that the characteristic curve of the target discharged air temperature TAV is as shown by a dotted line in FIG. 9. Thus, the value of the target temperature TAV when the detected sun radiation amount Ts is 400 W/m² should be 20° C. Contrary to this, if the required discharge air temperature calculated by the equation (1) is 60° C., the target temperature correction sun radiation amount TSB has a value of 800 W/m² as shown in FIG. 8, so that the characteristic curve of the target discharged air temperature TAV is as shown by a solid line in FIG. 9. Thus, the value of the target temperature TAV when the detected sun radiation amount Ts is 400 W/m² should be 25° C.

In short, in the above embodiment, even for the same value of the detected sun radiation amount Ts, the value of target discharged air temperature TAV increases as the required discharged air temperature TAOB increases, at the region of the value of the TAOB between 50° (first predetermined value) and 60° C. (second predetermined value). The advantage of this control is as follows. In a winter season, due to a reduction of the atmospheric air temperature or the temperature of the air, a situation may occur that the required discharged air temperature TAOB is larger than the first predetermined value (50° C.). A sun radiation cause the amount of the air flow from the upper outlets 21 to be increased for cancelling the load by the sun radiation.

However, in this case, the temperature of the air discharged air is increased, thereby preventing a driver or a passenger from feeling cold irrespective of the increased discharged air amount.

Figure 10:
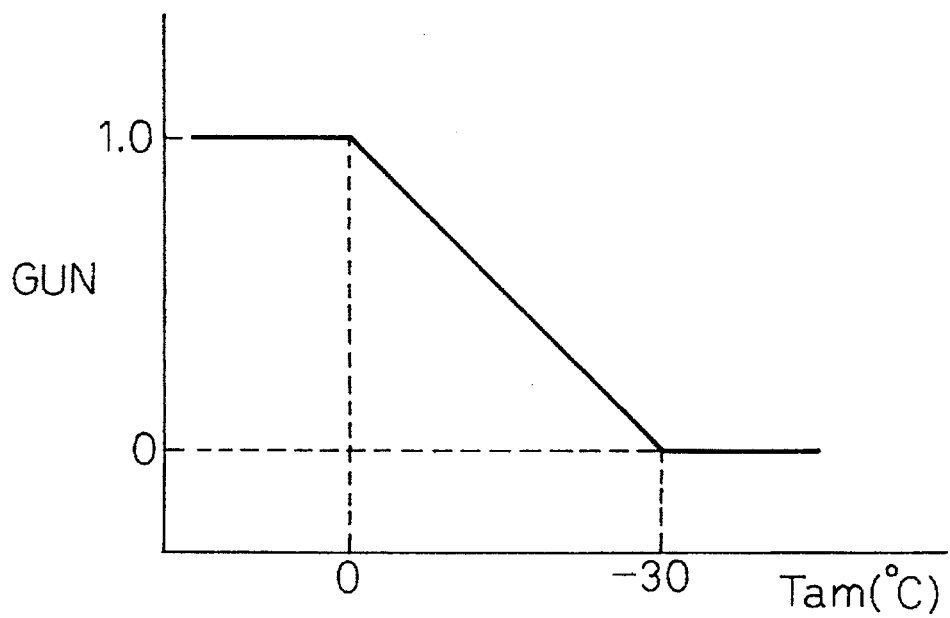
FIG. 10 is modification of FIG. 4 and is a graph showing relationship between an outside air temperature (Tam) and a sun radiation correction factor (GUN) in a second embodiment.
Figure 11:
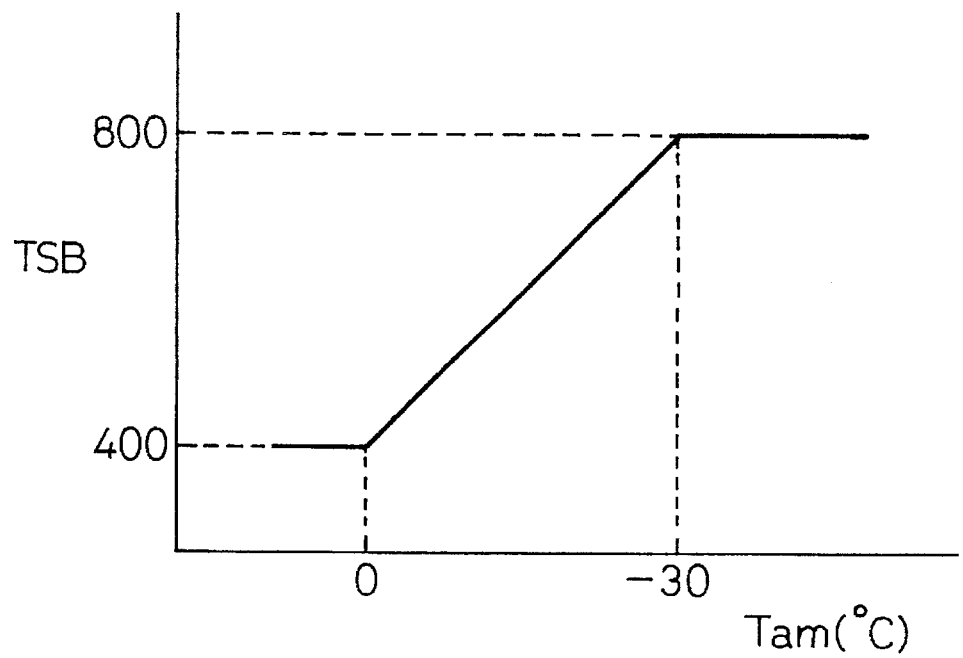
FIG. 11 is modification of FIG. 8 and is a graph showing relationship between an outside air temperature and the target air temperature correcting sun radiation amount (TSB) in a second embodiment.

In the first embodiment as explained above, the sun radiation correction factor GUN and the target temperature correction sun radiation amount TSB are set in accordance with the required discharged air temperature TAOB as shown in FIGS. 4 and 9, respectively. However, in a second embodiment, the sun radiation correction factor GUN and the sun radiation amount TSB are set in accordance with the second atmosphere air temperature Tam as shown in FIGS. 10 and 11, respectively.

Figure 12:
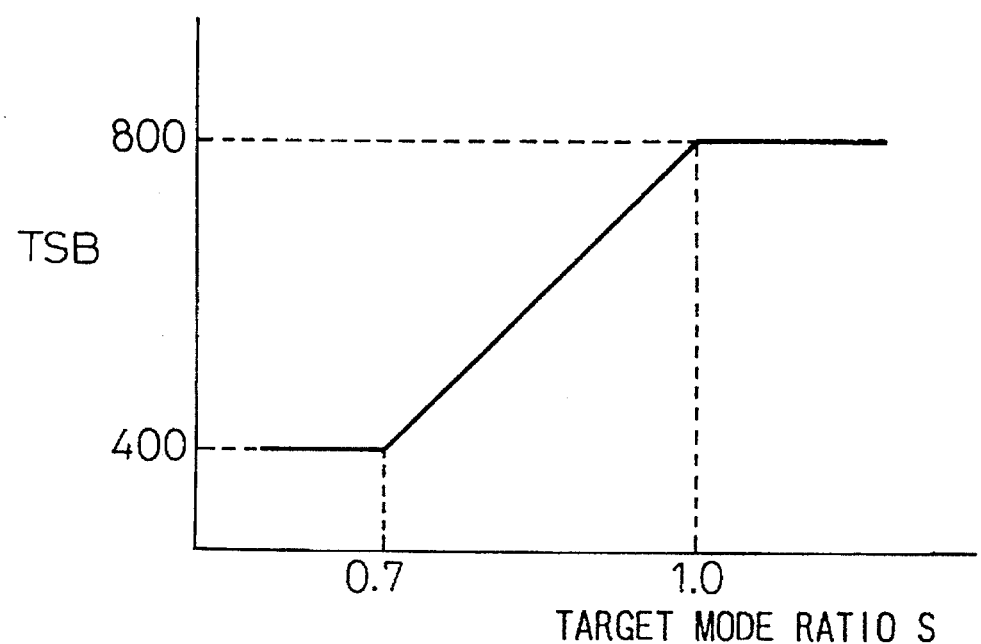
FIG. 12 is modification of FIG. 8 and is a graph showing the relationship between a target mode ratio and the target air temperature correcting sun radiation amount (TSB) in a third embodiment.

As shown in FIG. 12, the target temperature correcting sun radiation amount TSB can be calculated in accordance with the target mode ratio. Namely, when the value of the mode ratio is 1.0 (lower outlet mode as shown in FIG. 7), which corresponds to a low outside air temperature, the value of the TSB is 800 W/m$^2$, while, when the value of the mode ratio is 0.7 (bi-level mode as shown in FIG. 7), which corresponds to a high outside air temperature, the value of the TSB is 400 W/m$^2$. When the target mode ratio S is 1.0, the target temperature TAV is calculated based on the solid line, while, when the target mode ratio S is 0.7, the target temperature TAV is calculated based on the dotted line. Namely, for the same amount of the detected sun radiation Ts, the value of the target temperature TAV during the lower outlet mode is higher than the value of the target temperature TAV during the bi-level mode. Namely, for the same amount of the sun radiation, the nearer the upper level mode, the higher is the value of the TSB (the target temperature), which allows the sun radiation load to be canceled while preventing the driver or passenger from feeling cold.

Figure 13:
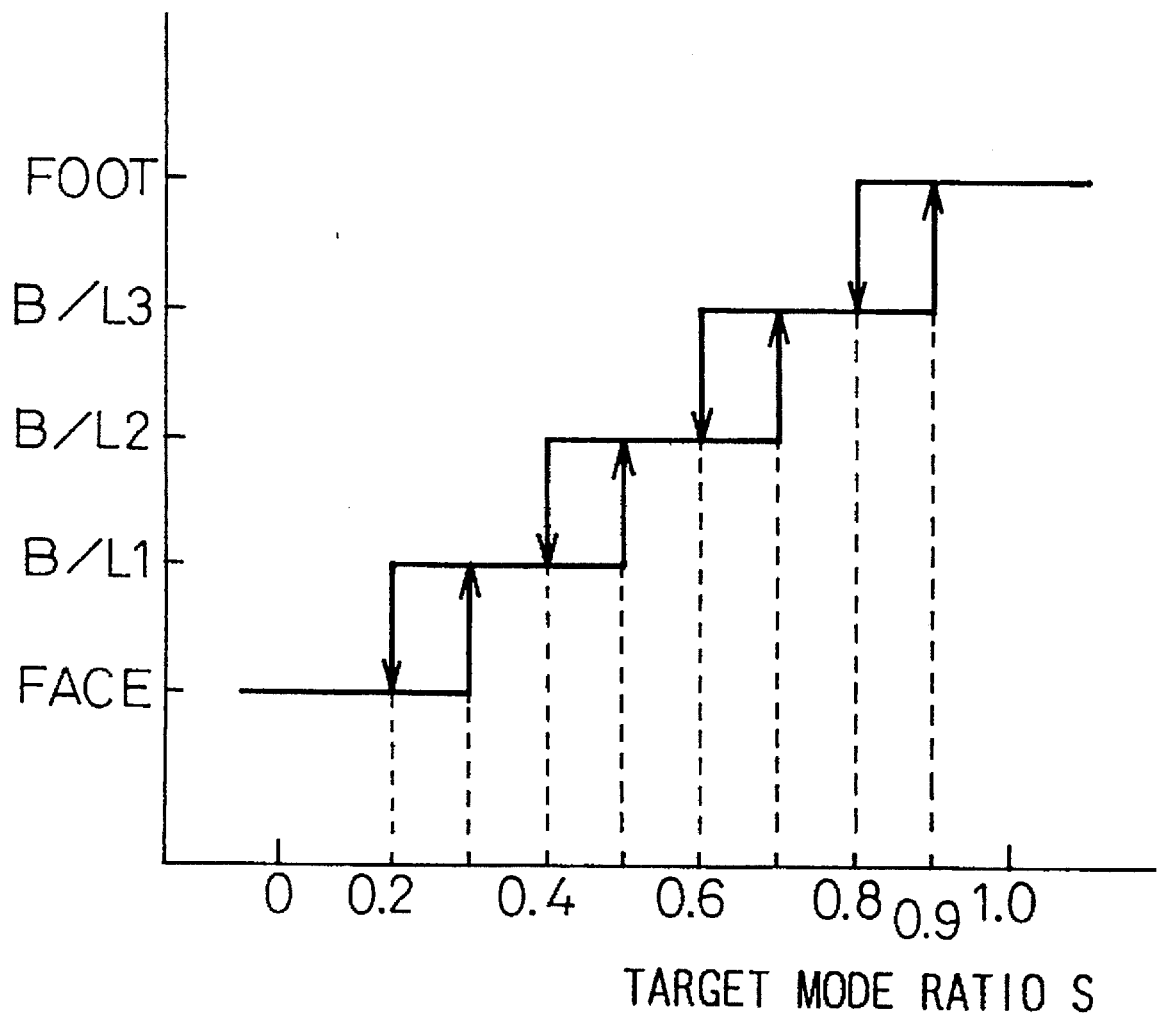
FIG. 13 is a modification of FIG. 7 and shows the relationship between a target mode ratio and outlet modes in a fourth embodiment.

In place of single step bi-level mode as shown in FIG. 7 in the first embodiment, a multiple step bi-level mode can be employed as shown in FIGS. 13, which makes the actual outlet mode to be well conformed with the target mode ratio S. As will be seen from the equations (2) and (4), the target mode ratio S is calculated based on the sun radiation correction factor GUN. As a result, the larger the deviation of the actual outlet mode from the target mode ratio S, the larger is the deviation of the actual amount of the air, discharged from the upper outlets 21, from the desired value. As a result, the precision of the control of the air amount from the upper outlets 21 in accordance with the value of the sun radiation correction factor GUN is reduced. The modification in FIG. 13 can, however, obviate this drawback since a precise control of the actual outlet mode to the target mode ratio S is possible. Namely, an increased precision of the control of the air amount from the upper outlets 21 can be obtained in accordance with the value of the sun radiation correction factor GUN.

In the modification, in place of the provision of the cool air by-pass passageway 29 and the door 30, the air duct 11 would be divided into a first section connected to the upper outlets 21 and a second section connected to the lower outlets 23. Air mix doors are provided in both of the first and second sections, so that the air mix doors can be independently controlled to adjust the amount of air discharged from the upper and lower outlets 21 and 23, respectively.

We claim:

1. An air conditioning system for a cabin of a vehicle, comprising:

a duct having, at its upstream end, an inlet for the introduction of an air flow and having, at its downstream end, an upper outlet opened to the cabin at its upper location and a lower outlet opened to the cabin at its lower location;

means for generating an air flow in the duct so that a desired amount of the air is discharged from the desired at least one of the upper and lower outlets;

means for detecting a sun radiation amount introduced into the cabin;

means, based on the detected sun radiation amount, for calculating an increased amount of air discharged from said upper outlet into the cabin;

means for detecting a temperature of air outside the cabin;

means, responsive to the detected temperature for correcting the calculated increased air amount so as to cause it to be reduced when it is determined that the outside air temperature is lower than a predetermined value;

means for controlling the air flow generating means in such a manner that said corrected calculated increased air flow from the upper outlet is obtained;

means for setting the temperature inside the cabin;

means for detecting the temperature inside the cabin; and means, based on the set temperature, the detected inside temperature, and the detected outside temperature, for calculating a required temperature of the air flow discharged into the cabin, wherein said means for correcting the calculated increased air amount corrects the calculated increased air amount when it is determined that the calculated require temperature is larger than a predetermined value.

2. An air conditioning system for a cabin of a vehicle, comprising:

a duct having, at its upstream end, an inlet for the introduction of an air flow and having, at its downstream end, an upper outlet opened to the cabin at its upper location and a lower outlet opened to the cabin at its lower location;

means for generating an air flow n the duct so that a desired amount of the air is discharged from the desired at least one of the upper and lower outlets;

means for detecting a sun radiation amount introduced into the cabin;

means, based on the detected sun radiation amount, for calculating an increased amount of air discharged from said upper outlet into the cabin;

means for detecting a temperature of air outside the cabin;

means, responsive to the detected temperature for correcting the calculated increased air amount so as to cause it to be reduced when it is determined that the outside air temperature is lower than a predetermined value; and means for controlling the air flow generating means in such a manner that said corrected calculated increased air flow from the upper outlet is obtained, wherein said means for correcting the increased air amount comprises means for calculating a sun radiation correcting factor, the value of which is varied from 1.0 to 0 in accordance with the increase in the outside air temperature when it is determined that the outside air temperature is lower than a predetermined value, and means for obtaining a reduced value of the increased air amount by multiplying the value by the calculated increased amount.

3. An air conditioning system for a cabin of a vehicle, comprising:

a duct having, at its upstream end, an inlet for the introduction of an air flow and having, at its downstream end, an upper outlet opened to the cabin at its upper location and a lower outlet opened to the cabin at its lower location;

means for generating an air flow in the duct so that a desired amount of the air is discharged from the desired at least one of the upper and lower outlets;

means for detecting a sun radiation amount introduced into the cabin;

means, based on the detected sun radiation amount, for calculating an increased amount of air discharged from said upper outlet into the cabin;

means for detecting a temperature of air outside the cabin;

means, responsive to the detected temperature for correcting the calculated increased air amount so as to cause it to be reduced when it is determined that the outside air temperature is lower than a predetermined value;

means for controlling the air flow generating means in such a manner that said corrected calculated increased air flow from the upper outlet is obtained;

means for setting the temperature inside the cabin;

means for detecting the temperature inside the cabin;

means, based on the set temperature, the detected inside temperature, and the detected outside temperature, for calculating a required temperature of the air flow discharged into the cabin;

means, based on the calculated required discharged air temperature, for calculating a basic air flow amount; and means, based on the basic air flow amount and the corrected air flow amount, for calculating a total air flow amount to be discharged into the cabin, wherein said control means controls the air flow generating means in such a manner that the total air flow amount discharged to the cabin corresponds to the calculated total air flow amount.

4. An air conditioning system for a cabin of a vehicle, comprising:

a duct having, at its upstream end, an inlet for the introduction of an air flow and having, at its downstream end, an upper outlet opened to the cabin at its upper location and a lower outlet opened to the cabin at its lower location;

means for generating an air flow in the duct so that a desired amount of the air is discharged from the desired at least one of the upper and lower outlets;

means for detecting a sun radiation amount introduced into the cabin;

means, based on the detected sun radiation amount, for calculating an increased amount of air discharged from said upper outlet into the cabin;

means for detecting a temperature of air outside the cabin;

means, responsive to the detected temperature for correcting the calculated increased air amount so as to cause it to be reduced when it is determined that the outside air temperature is lower than a predetermined value;

means for controlling the air flow generating means in such a manner that said corrected calculated increased air flow from the upper outlet is obtained;

means for controlling an outlet mode between a lower outlet mode where the air is discharged into the cabin from the lower outlet, an upper outlet mode where the air is discharged into the cabin for the upper outlet, and a bi-level mode where the air is discharged into the cabin from both of the lower and upper outlets; and means for urging the system so that it is switched to the bi-level mode when the correction of the increased air flow amount is done under the lower outlet mode.

5. An air conditioning system for a cabin of a vehicle, comprising:

a duct having, at its upstream end, an inlet for the introduction of an air flow and having, at its downstream end, an upper outlet opened to the cabin at its upper location and a lower outlet opened to the cabin at its lower location;

first means for obtaining an air flow of a desired temperature discharged from the upper and lower outlets;

second means for obtaining an air flow of a temperature of the air discharged from upper outlet, which is independent from the temperature of the air flows obtained by the first means;

means for detecting a sun radiation amount introduced into the cabin;

means, based on the detected sun radiation amount, for calculating a temperature of the air to be discharged from the upper outlet;

means for detecting a temperature of the air outside the cabin;

means, responsive to the detected temperature, for correcting said calculated temperature so as cause it to be increased when it is determined that the outside air temperature is lower than a predetermined value; and means for controlling said second means in such a manner that the temperature of the air flow from the upper outlet corresponds to the corrected temperature.

6. A system according to claim 5, further comprising;

means for setting the temperature inside the cabin;

means for detecting the temperature inside the cabin; and means, based on the set temperature, the detected inside temperature, and the detected outside temperature, for calculating a required temperature of the air flow discharged into the cabin, and wherein correcting means corrects the calculated increased temperature when it is determined that the calculated require temperature is larger than a predetermined value.

7. A system according to claim 5, wherein said correcting means corrects the calculated increased air temperature when it is determined that the detected outside air is lower than a predetermined value.

8. A system according to claim 5, further comprising means for detecting the ratio of the amount of the air discharged to the cabin from the lower outlet to the total amount of air discharged from the upper and lower outlets, and wherein said correcting means corrects the increased air temperature when the detected ratio is larger than a predetermined value.

9. A system according to claim 5, wherein said correcting means corrects the increased air temperature in such a manner that the lower the outside air temperature, the higher is the temperature of the air discharged from the upper outlet.

10. A system according to claim 5, further comprising:

unified means for controlling the temperature of the air discharged from the upper and lower outlets;

means for setting the temperature inside the cabin;

means for detecting the temperature inside the cabin;

means, based on the set temperature, the detected inside temperature and the detected outside temperature, for calculating the required temperature of the air flow discharged into the cabin, and means, based on the calculated required discharged air temperature, for calculating a basic air flow amount;

said unified control means controlling the temperature of the air discharged from the lower outlet so as to cause it to conform to the required discharged air temperature.

11. A system according to claim 4, further comprising:

means for controlling an outlet mode between a lower outlet mode where the air is discharged into the cabin from the lower outlet, an upper outlet mode where the air is discharged into the cabin from the upper outlet, and a bi-level mode where the air is discharged into the cabin from both of the lower and upper outlets, and means for urging the system so that it is switched to the bi-level mode when the correction of the temperature is done under the lower outlet mode.

* * * * *